UNITED STATES PATENT OFFICE.

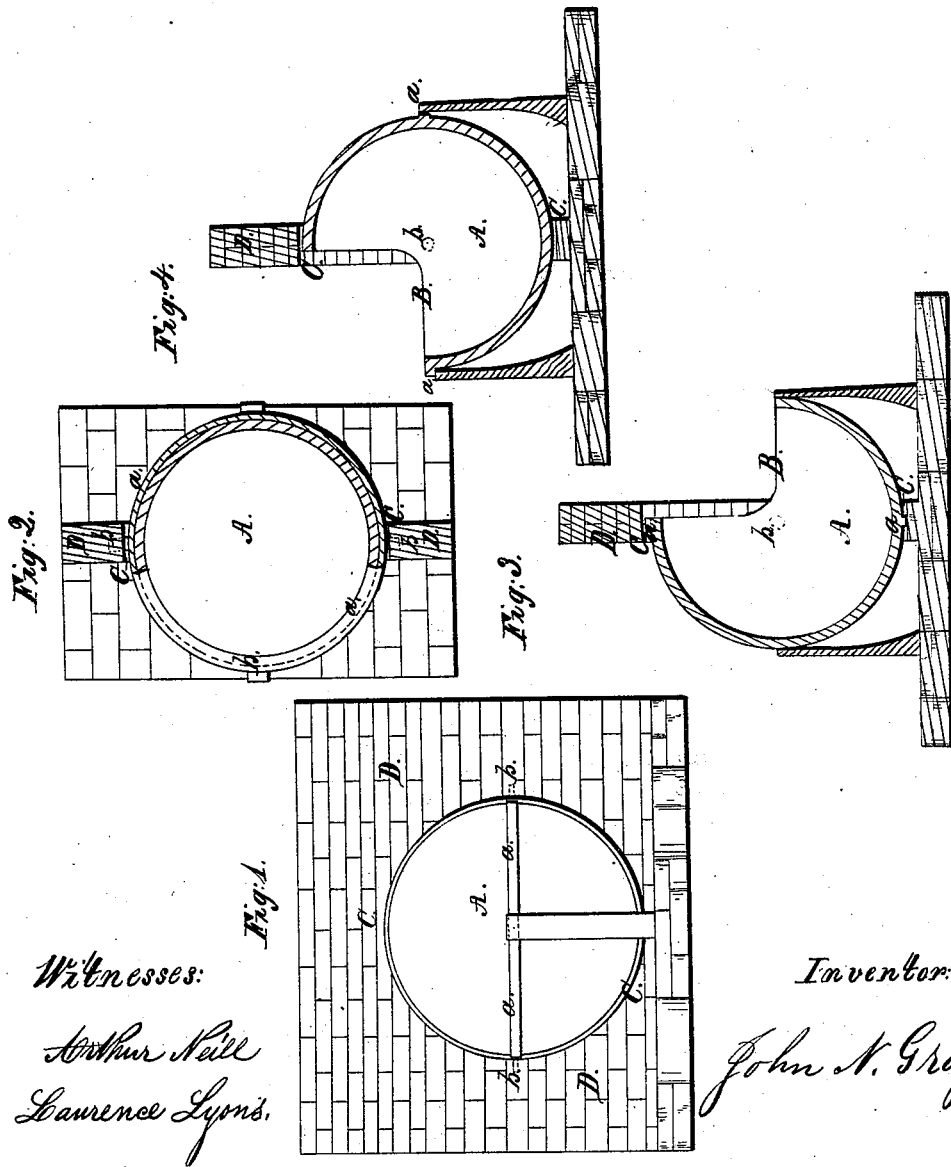

JOHN N. GRAY, OF LYNN, MASSACHUSETTS, ASSIGNOR TO DANIEL SAGER, OF ALBANY, NEW YORK.

ANIMAL-FEEDING TROUGH.

Specification forming part of Letters Patent No. 42,909, dated May 24, 1864.

*To all whom it may concern:*

Be it known that I, JOHN N. GRAY, of Lynn, in the county of Essex and State of Massachusetts, have invented a new and useful improvement in the construction and application of animal-feeding troughs to pens or stalls; and I do hereby declare the same to be described and represented in the following specification and the accompanying drawings, of which—

Figure 1 is a front elevation, Fig. 2 a horizontal section, and Figs. 3 and 4 transverse and vertical sections, of my vertical turning trough and its opening, as arranged within a wall or side of a hog-pen or stall for containing one or more animals.

In the said figures, the feeding trough or vessel A is represented as hollow and spherical in form and furnished with a quarter-spherical mouth, B. The whole vessel or trough so formed may be made or cast in one solid piece, or it may be constructed of sheet metal, or wood, or other suitable material. I prefer for general purposes to construct it of cast-iron and to found it in one solid piece. I usually make it with a zone or belt, *a*, to extend entirely around it and extend from its outer surface a short distance, in manner as shown in the drawings. This spherical trough I place in a circular opening, C, made in the wall D or side of a hog pen or sty, the said opening being of a diameter sufficient to receive the trough and permit it to project an equal distance from each side of the said wall or side. Diametrically of the opening C and the trough A, the two may be provided with journals and bearings arranged horizontally, as shown at *b b* in Fig. 2, and so as to enable the trough to be revolved in a vertical plane, so as to carry its mouth either to one side or the other of the wall, as shown in Figs. 3 and 4. When the mouth is on the inside of the wall, the hog or animal within the pen or sty can obtain access to the interior of the trough; but when the mouth is turned to the outside of the wall access to the trough will be cut off relatively to the said hog or animal, the mouth being in a condition to receive the feeding material from a person stationed on the outside of the wall. Furthermore, if it may be desirable to discharge from the trough any of its contents, it may be rotated vertically one hundred and eighty degrees, or thereabout, so that by the mode of constructing the trough and applying it to the wall it may be easily discharged of its contents.

It is obvious that the trough may be made of any other form desired—as, for instance, in the shape of a long trough or manger when used for feeding a number of hogs, calves, or horses. It is also obvious that it may be mounted in any other desired position than that shown—as, for instance, entirely on the inside or outside of the wall, instead of in the opening in the wall. This latter arrangement will be more desirable when the trough is used as a manger for feeding horses and cattle, and also when used as a watering trough, for which it is equally well adapted.

Having thus described my invention and its construction and operation, what I claim as my invention, and desire to secure by Letters Patent of the United States, is—

An animal-feeding trough so constructed and arranged as to permit of its being rotated in a vertical plane, substantially as described.

JOHN N. GRAY.

Witnesses:
R. H. EDDY,
F. P. HALE, Jr.